United States Patent
Deng et al.

(10) Patent No.: US 7,706,945 B2
(45) Date of Patent: Apr. 27, 2010

(54) VEHICLE LATERAL CONTROL SYSTEM

(75) Inventors: Weiwen Deng, Rochester Hills, MI (US); Yong H. Lee, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 210 days.

(21) Appl. No.: 11/838,032

(22) Filed: Aug. 13, 2007

(65) Prior Publication Data

US 2008/0195280 A1    Aug. 14, 2008

Related U.S. Application Data

(62) Division of application No. 11/220,996, filed on Sep. 7, 2005.

(51) Int. Cl.
| | |
|---|---|
| A01B 69/00 | (2006.01) |
| B62D 6/00 | (2006.01) |
| B62D 12/00 | (2006.01) |
| B63G 8/20 | (2006.01) |
| B63H 25/04 | (2006.01) |
| G05D 1/00 | (2006.01) |

(52) U.S. Cl. .............................. 701/41; 701/23; 701/25; 701/36; 701/38; 701/69; 701/70; 701/71; 701/82; 701/83; 701/91; 701/93; 180/117; 180/119; 180/197; 180/408; 180/445; 303/139; 303/146

(58) Field of Classification Search ................... 701/71, 701/91, 93, 48, 36, 38, 41, 69, 23, 25, 70, 701/82, 83, 91.93; 180/197, 117, 119, 408, 180/445; 303/139, 146
See application file for complete search history.

(56) References Cited

U.S. PATENT DOCUMENTS

| | | | | | |
|---|---|---|---|---|---|
| 3,230,348 | A | * | 1/1966 | Hammond, Jr. ............. | 235/400 |
| 4,615,410 | A | * | 10/1986 | Hosaka ........................ | 180/197 |
| 4,898,431 | A | * | 2/1990 | Karnopp et al. ............. | 303/146 |
| 5,243,523 | A | * | 9/1993 | Stepper et al. ............... | 700/304 |
| 5,440,486 | A | * | 8/1995 | Rudzewicz et al. ........... | 701/36 |
| 5,448,487 | A | * | 9/1995 | Arai ............................ | 701/28 |
| 5,524,079 | A | * | 6/1996 | Ishida et al. .................. | 701/42 |
| 5,627,756 | A | * | 5/1997 | Fukada et al. ................. | 701/70 |
| 5,702,165 | A | * | 12/1997 | Koibuchi ..................... | 303/146 |
| 5,752,752 | A | * | 5/1998 | Tozu et al. ................... | 303/146 |
| 5,762,406 | A | * | 6/1998 | Yasui et al. .................. | 303/146 |
| 5,790,970 | A | * | 8/1998 | Brachert et al. ............... | 701/70 |
| 5,826,951 | A | * | 10/1998 | Sano .......................... | 303/146 |
| 5,869,753 | A | * | 2/1999 | Asanuma et al. .......... | 73/117.01 |

(Continued)

*Primary Examiner*—Khoi Tran
*Assistant Examiner*—Jorge O Peche
(74) *Attorney, Agent, or Firm*—John A. Miller; Miller IP Group, PLC

(57) ABSTRACT

A vehicle lateral control system that integrates both vehicle dynamics and kinematics control. The system includes a driver interpreter that provides desired vehicle dynamics and predicted vehicle path based on driver input. Error signals between the desired vehicle dynamics and measured vehicle dynamics, and between the predicted vehicle path and the measured vehicle target path are sent to dynamics and kinematics control processors for generating a separate dynamics and kinematics command signals, respectively, to minimize the errors. The command signals are integrated by a control integration processor to combine the commands to optimize the performance of stabilizing the vehicle and tracking the path. The integrated command signal can be used to control one or more of front wheel assist steering, rear-wheel assist steering or differential braking.

16 Claims, 3 Drawing Sheets

U.S. PATENT DOCUMENTS

| | | | |
|---|---|---|---|
| 5,947,221 A * | 9/1999 | Taniguchi et al. | 180/197 |
| 6,005,492 A * | 12/1999 | Tamura et al. | 340/937 |
| 6,027,183 A * | 2/2000 | Katayose et al. | 303/146 |
| 6,236,915 B1 * | 5/2001 | Furukawa et al. | 701/25 |
| 6,292,111 B1 * | 9/2001 | Ishikawa et al. | 340/937 |
| 6,308,123 B1 * | 10/2001 | Ikegaya et al. | 701/41 |
| 6,334,500 B1 * | 1/2002 | Shin | 180/197 |
| 6,338,015 B1 * | 1/2002 | Kawagoe et al. | 701/41 |
| 6,405,132 B1 * | 6/2002 | Breed et al. | 701/301 |
| 6,453,228 B1 * | 9/2002 | Shimada | 701/89 |
| 6,489,887 B2 * | 12/2002 | Satoh et al. | 340/436 |
| 6,553,293 B1 * | 4/2003 | Hac | 701/42 |
| 6,571,160 B2 * | 5/2003 | Akita | 701/42 |
| 6,659,570 B2 * | 12/2003 | Nakamura | 303/146 |
| 6,894,605 B2 * | 5/2005 | Isogai et al. | 340/435 |
| 6,944,544 B1 * | 9/2005 | Prakah-Asante et al. | 701/301 |
| 7,010,409 B2 * | 3/2006 | Lu et al. | 701/70 |
| 7,162,333 B2 * | 1/2007 | Koibuchi et al. | 701/1 |
| 2002/0022916 A1 * | 2/2002 | Akita | 701/42 |
| 2002/0032512 A1 * | 3/2002 | Shimada | 701/89 |
| 2002/0109402 A1 * | 8/2002 | Nakamura | 303/146 |
| 2003/0130783 A1 * | 7/2003 | Hellmann et al. | 701/93 |
| 2005/0027402 A1 * | 2/2005 | Koibuchi et al. | 701/1 |
| 2005/0080542 A1 * | 4/2005 | Lu et al. | 701/70 |
| 2005/0080543 A1 * | 4/2005 | Lu et al. | 701/70 |
| 2005/0096827 A1 * | 5/2005 | Sadano et al. | 701/70 |
| 2005/0192728 A1 * | 9/2005 | Yasui et al. | 701/38 |
| 2005/0225477 A1 * | 10/2005 | Cong et al. | 342/70 |
| 2006/0167600 A1 * | 7/2006 | Nelson et al. | 701/23 |
| 2006/0253240 A1 * | 11/2006 | Rao et al. | 701/48 |
| 2007/0046677 A1 * | 3/2007 | Hong et al. | 345/442 |
| 2007/0055431 A1 * | 3/2007 | Deng et al. | 701/71 |
| 2007/0085850 A1 * | 4/2007 | Hong et al. | 345/442 |
| 2007/0091094 A1 * | 4/2007 | Hong et al. | 345/474 |
| 2007/0288152 A1 * | 12/2007 | Lu et al. | 701/70 |

* cited by examiner

VEHICLE LATERAL CONTROL SYSTEM

CROSS-REFERENCE TO RELATED APPLICATION

This application is a Divisional application of U.S. patent application Ser. No. 11/220,996, filed Sep. 7, 2005, titled "Method and Apparatus for Preview-Based Vehicle Lateral Control."

BACKGROUND OF THE INVENTION

1. Field of the Invention

This invention relates generally to a system for providing vehicle lateral stability control and, more particularly, to a system for providing vehicle lateral stability control that integrates vehicle dynamics control from sensor measurements and target path projections, and path tracking control that integrates vehicle kinematics control with vehicle dynamics control.

2. Discussion of the Related Art

Vehicle dynamics typically refers to the yaw, side-slip and roll of a vehicle and vehicle kinematics typically refers to vehicle path and lane tracking. Vehicle stability control systems are known in the art for providing stability control based on vehicle dynamics. Further, lane keeping and/or lane tracking systems are known that use vehicle kinematics. If the vehicle is traveling along a curve where the road surface has a low coefficient of friction because of ice or snow, vehicle dynamics and kinematics are both important. Conventionally, vehicle dynamics and kinematics control were performed separately and independently although they may be coordinated by a supervisory control, but only to an extent that they do not interfere with each other.

A typical vehicle stability control system relies solely on the driver steering input to generate a control command for steering assist and/or differential braking. However, driver response and style vary greatly, and there is no reliable way to identify the driving skill level and the driving style to determine how the driver is handling a particular driving situation. Contributing factors include driver incapacity, lack of experience, panic situation, etc.

Further, during a path tracking maneuver, the vehicle may encounter stability problems because of sensor data quality, such as noise, slow through-put and possible environmental disturbances. Also, because the road surface condition is unknown, and typically is not considered for path-tracking control, the same control design for a high coefficient of friction surface may generate a significant vehicle oscillation or even instability for a vehicle traveling on a low coefficient of friction surface.

SUMMARY OF THE INVENTION

In accordance with the teachings of the present invention, a vehicle lateral control system is disclosed that integrates both vehicle dynamics control and kinematics control. The system includes a driver interpreter that generates desired vehicle dynamics and a predicted vehicle path based on driver input. Error signals between desired and measured vehicle dynamics, and between the predicted vehicle path and the measured vehicle path are sent to dynamics and kinematics control processors, respectively, for generating separate dynamics and kinematics command signals. The command signals are integrated by a control integration processor to combine the commands and reduce the error signals to stabilize the vehicle as well as tracking the path. The integrated command signal can be used to control a front-wheel assist steering, rear-wheel assist steering and/or differential braking.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a vehicle lateral control system that combines both vehicle dynamics control and kinematics control is merely exemplary in nature, and is in no way intended to limit the invention or its applications or uses.

Figure 1:
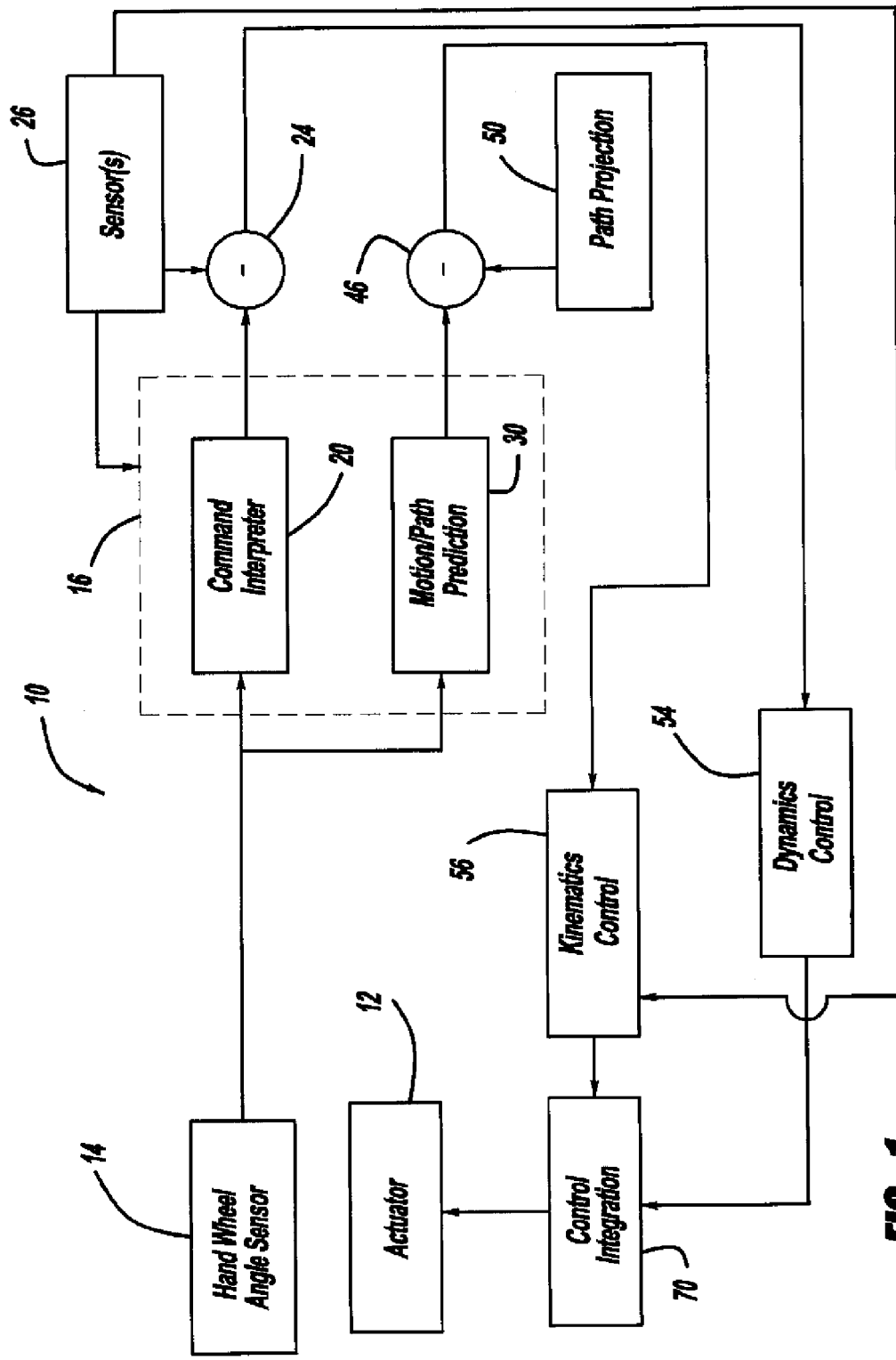
FIG. 1 is a block diagram of a vehicle lateral control system that combines both vehicle dynamics and kinematics control, according to an embodiment of the present invention.

FIG. 1 is block diagram of a vehicle lateral stability control system 10, according to an embodiment of the present invention. As will be discussed in detail below, the control system 10 combines both vehicle dynamics control and vehicle kinematics control to improve the stability control of the vehicle and path tracking performance. Various vehicle sensors are used to provide the dynamics control, including a yaw rate sensor, a lateral acceleration sensor and a vehicle speed sensor, and one or more of a vision system, a radar system and/or a map data base with a GPS sensor are used to provide the kinematics control. The vehicle dynamics control controls the vehicle yaw rate and/or side-slip (rate), and the vehicle kinematics control controls vehicle path and/or lane tracking.

The system 10 generates an integrated control command that is sent to an actuator 12 to assist the driver in controlling the vehicle to provide the lateral stability control and path tracking control. The actuator 12 is intended to be any one or more of several control actuators used in vehicle stability control systems, such as front-wheel steering assist actuators, real-wheel steering assist actuators, differential braking actuators, etc., all well known to those skilled in the art.

For the discussion below, the following nomenclature is used:

a: distance between the vehicle front axle and the vehicle center of gravity;
b: distance between the vehicle rear axle and the vehicle center of gravity;
$C_f$: vehicle front tire cornering stiffness;
$C_r$: vehicle rear tire cornering stiffness;
$I_z$: vehicle moment of inertia to the center of gravity;
L: feedback gain of a state observer;
m: vehicle mass;
r: vehicle yaw rate;
u: vehicle speed;
$v_y$: vehicle lateral speed;

x: system state variables;

δ_f: vehicle front wheel angle; and

δ_r: vehicle rear wheel angle.

The system 10 includes a hand-wheel angle sensor 14 that measures the angle of the vehicle hand-wheel to provide a signal indicative of the driver steering intent. The hand-wheel angle sensor 14 is one known device that can provide driver steering intent. Those skilled in the art will recognize that other types of sensor, such as road wheel angle sensors, can also be employed for this purpose. Also, the driver input can be a braking input or a throttle input in other embodiments.

The signal from the hand-wheel angle sensor 14 is provided to a driver interpreter 16. The driver interpreter 16 includes a command interpreter processor 20 that interprets the driver input as desired yaw rate and/or side-slip (rate) based on the hand-wheel angle signal. In other words, the processor 20 interprets the driver steering to desired vehicle dynamics. In one non-limiting embodiment, the command interpreter processor 20 uses a two-degree of freedom bicycle model for a high-coefficient of friction surface, well known to those skilled in the art. The desired yaw rate and/or the desired side-slip (rate) signals are sent to a subtractor 24.

Additionally, sensor measurement signals from sensors 26 are provided to the subtractor 24. The subtractor 24 subtracts the signals and provides a vehicle dynamical error signal $\Delta e_{dyn}$. The sensors 26 are intended to represent any of the sensors used in the system 10, including, but not limited to, a yaw rate sensor, a lateral acceleration sensor and a vehicle speed sensor. If the command interpreter processor 20 provides a yaw rate signal, then the actual measurement from the vehicle yaw rate sensor is used. If the command interpreter processor provides a desired side-slip rate signal, then an estimate of the side-slip rate is provided from the yaw rate sensor and the lateral acceleration sensor. It is well known in the art how to provide an estimate of the side-slip rate.

Figure 2:
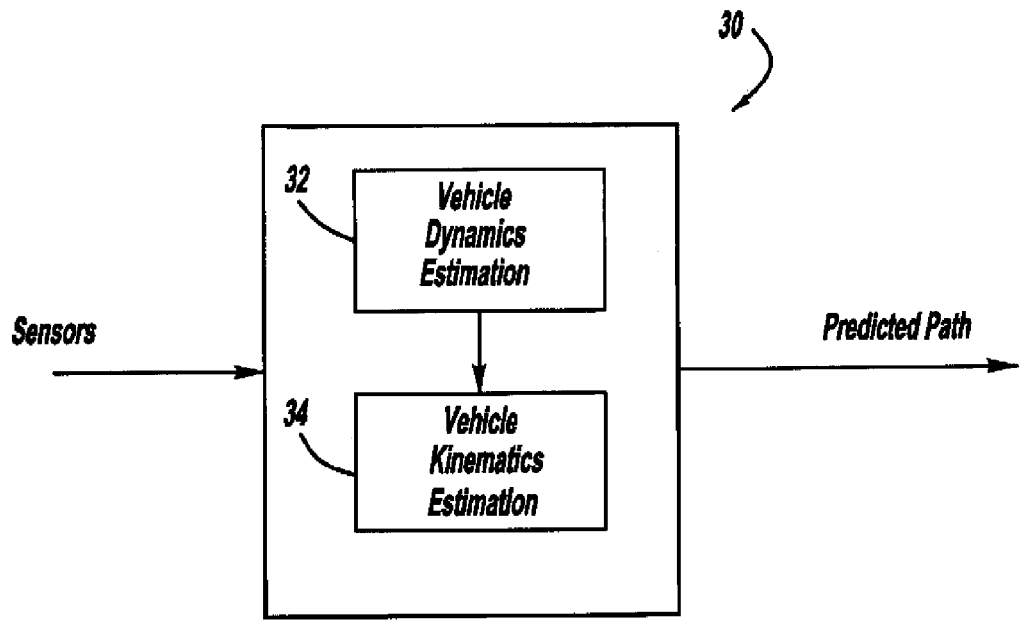
FIG. 2 is a block diagram of the motion/path prediction processor of the system shown in FIG. 1.

The driver interpreter 16 also includes a motion/path prediction processor 30 that receives the hand-wheel angle signal. The prediction processor 30 generates an objectively predicted path signal of the trajectory or the path of the vehicle as $\hat{y}=[\hat{y}_0, y_1 \ldots \hat{y}_N]$. FIG. 2 is a block diagram of the prediction processor 30, according to one embodiment of the present invention, that includes a vehicle dynamics estimation processor 32 and a vehicle kinematics estimation processor 34.

Figure 3:
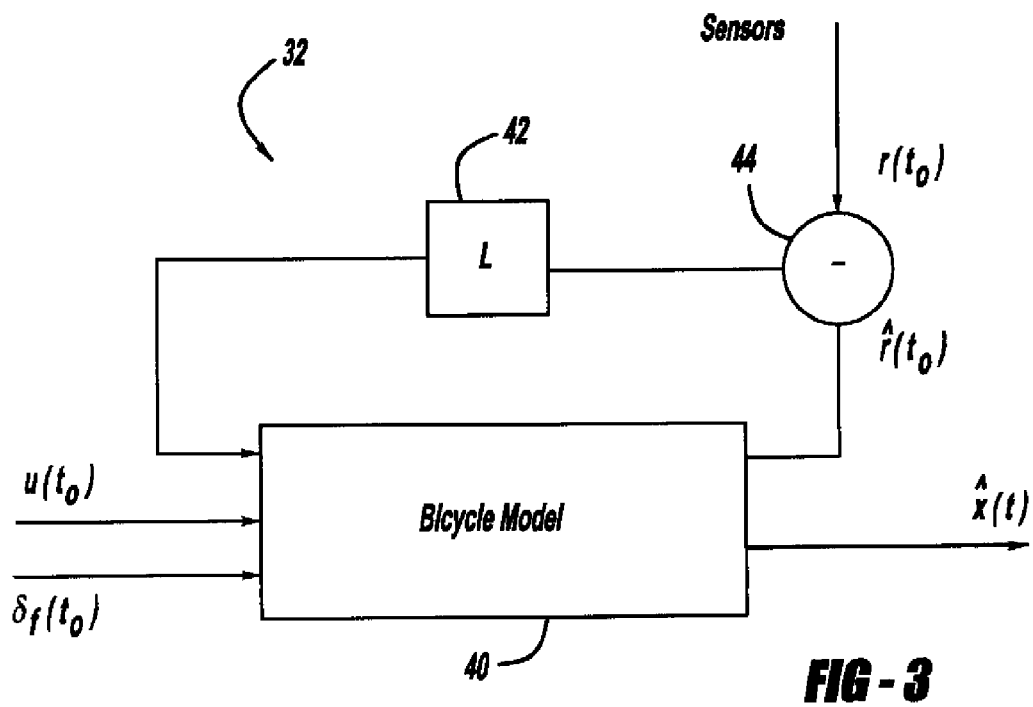
FIG. 3 is a block diagram of the command interpreter processor of the system shown in FIG. 1.

The vehicle dynamics estimation processor 32 is shown in FIG. 3 and estimates the vehicle lateral velocity $v_y$ based on sensor inputs of the vehicle speed u, the steering angle $\delta_f$ and the vehicle yaw rate r. The vehicle dynamics estimation processor 32 includes a bicycle model processor 40, a feedback gain processor 42 and a subtractor 44. The bicycle model processor 40 receives the hand-wheel angle signal $\delta_f$ and the vehicle speed signal u and estimates vehicle states x including vehicle yaw rate and lateral speed. The vehicle yaw rate from the bicycle model processor 40 and the yaw rate signal r from the sensors 26 are applied to the subtractor 44 that generates an error signal that is sent to the feedback gain processor 42. The feedback gain processor 42 applies a gain L to the error signal that is sent to the bicycle model processor 40 to generate the vehicle state. Equation (1) below provides the calculation in the bicycle model processor 40 to determine the state variables x as:

$$\begin{bmatrix} \dot{\hat{r}} \\ \dot{\hat{v}}_y \end{bmatrix} = \begin{bmatrix} -\frac{C_f \cdot a^2 + C_r \cdot b^2}{I_z \cdot u} & \frac{C_r \cdot b - C_f \cdot a}{I_z \cdot u} \\ \frac{C_r \cdot b - C_f \cdot a}{m \cdot u} - u & \frac{C_f + C_r}{m \cdot u} \end{bmatrix} \cdot \begin{bmatrix} \hat{r} \\ \hat{v}_y \end{bmatrix} + \begin{bmatrix} \frac{C_f \cdot a}{I_z} & -\frac{C_r \cdot b}{I_z} \\ \frac{C_f}{m} & \frac{C_r}{m} \end{bmatrix} \cdot \begin{bmatrix} \delta_f \\ \delta_r \end{bmatrix} + L(\hat{r} - r) \quad (1)$$

The vehicle state signal from the vehicle dynamics estimation processor 32 is then sent to the vehicle kinematics estimation processor 34 to determine the vehicle heading with respect to a fixed vehicle coordinate system (X, Y) as:

$$\hat{X} = u \cdot \cos(\hat{\psi}) - \hat{v}_y \cdot \sin(\hat{\psi}) \quad (2)$$

$$\hat{Y} = u \cdot \sin(\hat{\psi}) + \hat{v}_y \cdot \cos(\hat{\psi}) \quad (3)$$

$$\dot{\hat{\psi}} = \hat{r} \quad (4)$$

Where $\Psi$ is the orientation of the vehicle. Thus, the predicted vehicle trajectory can be calculated as:

$$\hat{X}(t) = \hat{X}(t_0) + \int_{t_0}^{t} \dot{\hat{X}} \cdot dt \approx \hat{X}(t_0) + \Delta \hat{X} \quad (5)$$

$$\hat{Y}(t) = \hat{Y}(t_0) + \int_{t_0}^{t} \dot{\hat{Y}} \cdot dt \approx \hat{Y}(t_0) + \Delta \hat{Y} \quad (6)$$

The predicted path signal from the prediction processor 30 is sent to a subtractor 46. The system 10 also includes a path projection processor 50 that provides a target path signal to the subtractor 46. The path projection processor 50 can include one or more of a vision system, a radar system and/or a map system with a GPS sensor, all known to those skilled in the art, and available on some vehicle models. The target path signal may be different depending on what type of device the path projection processor 50 uses. For example, if the path projection processor 50 uses as radar system for collision avoidance, then the target path signal may be used to avoid another vehicle. However, if the path projection processor 50 uses a map system, then the target path system may just follow the road curvature. The processor 50 provides a target path signal to the subtractor 46 indicative of the curvature of the road ahead of the vehicle as a target path signal. The subtractor 46 generates a kinematical error signal $\Delta e_{kin}$, shown in equation (7) below, where $w_i$ is a weighting factor, as the difference between the predicted vehicle path from the prediction processor 30 and the target path from the processor 50. The weighting factor $w_i$ is used to properly weight the contributing importance of each path error, such as for reducing the weighting of projected paths farther from the vehicle.

$$\Delta e_{kin} = \sum_{i=1}^{N} w_i \Delta y_i \quad (7)$$

The error signal $\Delta e_{dyn}$ from the subtractor 24 is sent to a dynamics control processor 54. The dynamics control processor 54 uses the error signal $\Delta e_{dyn}$ to generate a dynamics control command signal $\delta_{cmd\_dyn}$ intended to minimize the dynamical error signal $\Delta e_{dyn}$. The dynamics control processor 54 can employ any suitable algorithm for this purpose, such as proportional-integral-derivative (PID) control. Many such algorithms exist in the art, as would be appreciated by those skilled in the art.

The kinematical error signal $\Delta e_{kin}$ from the subtractor 46 is sent to a kinematics control processor 56 that generates a kinematics control command signal $\delta_{cmd\_kin}$ based on the error signal $\Delta e_{kin}$ to minimize the kinematical error signal $\Delta e_{kin}$. In one embodiment, the kinematics control processor 56 uses an optimal control approach that minimizes a predefined cost function J or performance index. In one embodiment, the cost function J is defined in a quadratic form at the weighted difference between the predicted path and the target path as:

$$J = \frac{1}{T}\int_{t_0}^{T}\{y(t)-\hat{y}(t)\}^2 w(t)\,dt \qquad (8)$$

Where, y(t) and ŷ(t) are the vehicles target offset and predicted offset, respectively, and T is the preview time period.

Figure 4:
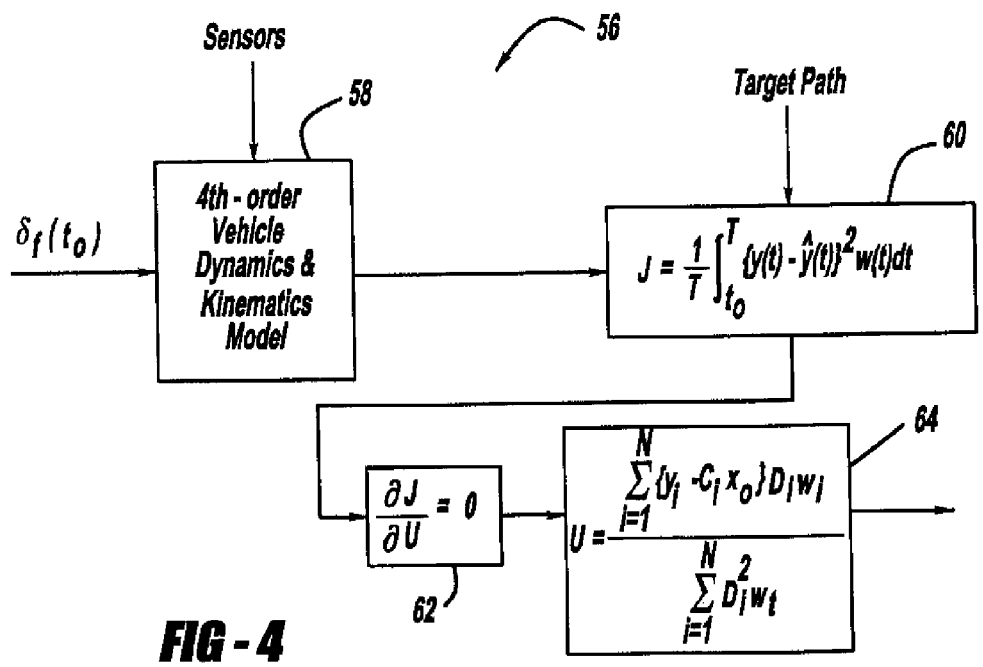
FIG. 4 is a block diagram of the kinematics control processor of the system shown in FIG. 1.

FIG. 4 is a block diagram of the kinematics control processor 56 that employs an optimal control approach. The processor 56 includes a fourth-order vehicle dynamics and kinematics model processor 58 that receives the hand-wheel angle signal $\delta_f$, the yaw rate signal r, the estimated lateral velocity $v_y$, and the vehicle speed signal u. The processor 58 generates a predicted offset signal ŷ(t) as $C(t)\hat{x}_0 + D(t)U$. The predicted offset signal ŷ(t) is sent to a cost function processor 60 that generates the predetermined cost function J by equation (8). Because equation (8) is a second order quadratic, a partial derivative of the cost function J will go to zero when the cost function J is minimized. A processor 62 takes a partial derivative of the cost function signal J, and a processor 64 generates the optimal control signal U. The optimal control signal U is the kinematics control command signal $\delta_{cmd\_kin}$. The optimal control signal U in a discreet form in equation (9) below provides an optimal steering control so that the performance index is minimized.

$$U = \frac{\sum_{i=1}^{N}\{y_i - C_i x_0\}D_i w_i}{\sum_{i=1}^{N} D_i^2 w_i} \qquad (9)$$

Where, $C_i$ and $D_i$ are the system free-response array and forced-response array, respectively, and N is the number of sampling points used during the preview time period.

The command signal $\delta_{cmd\_dyn}$ from the dynamics control processor 54 and the optimal control signal U from the kinematics control processor 56 are sent to a control integration processor 70. The control integration processor 70 integrates both the dynamics and the kinematics to provide an optimized system performance for both factors. The control integration processor 70 uses a process of weighting, including switching, the two command signals based on the determination of the driving situation. Various criteria go into determining the control integration strategy, according to the invention. For example, the control integration processor 70 considers deviations in the confidence level of the drivers command in target path. If there is enough deviation detected between the driver's steering signal and the target path, the confidence level on each needs to be checked, and the one with the higher confidence level will be used. Further, situation evaluation is used to determine which is more imminent and which is more severe, such as a crash versus a spin. In this case, a crash situation has a higher priority over a spin condition, and thus has a higher weight within a time to crash period. Further, the control integration processor 70 considers the time nature of the command, such as transient versus steady state. The path sensing is typically slow and reflects more on vehicle steady state, while dynamics is more in transient. Therefore, the weighting function switches between transient and steady state.

The control integration processor 70 outputs a command signal $\delta_{cmd}$ to the actuator 12 as $\rho_1(t)\delta_{cmd\_dyn} + \rho_2(t)\delta_{cmd\_kin}$, where $\rho(t)$ is a weighting function. For pure dynamics control, such as stability control, $\rho_1$ will be 1 and $\rho_2$ will be 0. For a pure kinematics control, such as vehicle lane/path tracking, $\rho_1$ will be 0 and $\rho_2$ will be 1. More generally, a command signal to the actuator 12 can be defined as a function of the dynamics and kinematics control commands, such as $f(\delta_{cmd\_dyn}, \delta_{cmd\_kin})$.

The control integration processor 70 is designed to handle cases where kinematics control is constrained as a result of slow sensing or data transfer from the processor 50. When the vehicle is traveling at high speeds, properly handling the slow throughput is necessary to avoid significant adverse effects. This is also useful in handling some occasional loss of data from the sensors.

Figure 5:
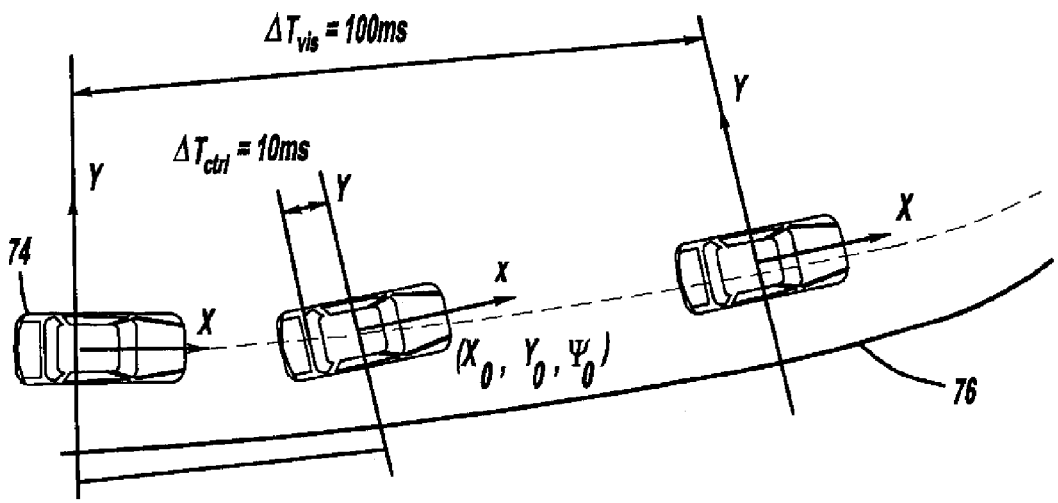
FIG. 5 is a depiction of a vehicle traveling along a curved path.

An example of handling the slow throughput of the processor 50 is depicted in FIG. 5 showing a vehicle 74 traveling along a curved path 76. The sampling loop for the particular sensor is $\Delta T_{vis}$ms, while the update rate for the control is $\Delta t_{ctrl}$ms. Relative to the faster update rate, the sensor data is slower and can be considered to be static. Because a vision sensor provides data in a set of series points (versus only a single value at a time for regular vehicle and dynamic sensor), a technique to manipulate the data in a faster rate can be provided.

A vehicle-fixed coordinate system (X,Y) is defined at the time where a set of vision data is read, and a vehicle-fixed coordinate system (x,y) is defined at each of the updating time for control. The position and the orientation of (x,y) with respect to (X,Y) can be estimated as $(X_0, Y_0, \Psi_0)$, similarly based on motion/path estimation from equations (1)-(6). Thus, the coordinate transform can be performed from (X,Y) to (x,y) as:

$$\begin{bmatrix} x \\ y \end{bmatrix} = \begin{bmatrix} \cos\Psi & -\sin\Psi \\ \sin\Psi & \cos\Psi \end{bmatrix}^{-1} \begin{bmatrix} X-X_0 \\ Y-Y_0 \end{bmatrix} \qquad (10)$$

The sensor data read at the time for (X,Y) is defined as:

$$\bar{y} = [\bar{y}_0, \bar{y}_1, \bar{y}_2, \ldots \bar{y}_N]_{(X,Y)} \qquad (11)$$

Thus, the data can be transformed under (x,y) by equation (10) as:

$$\bar{y} = [\bar{y}_0, \bar{y}_1, \bar{y}_2, \ldots \bar{y}_N]_{(x,y)} \qquad (12)$$

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A vehicle lateral control system for a vehicle, said system comprising:
   a driver steering intent sensor for providing a driver steering intent signal;
   a yaw rate sensor for providing a measured yaw rate signal of the yaw rate of the vehicle;
   a lateral acceleration sensor for providing a measured lateral acceleration signal of the lateral acceleration of the vehicle;
   a vehicle speed sensor for providing a measured speed signal of the speed of the vehicle;
   a target path sub-system for providing a target path signal indicative of a path of the vehicle;
   a command interpreter processor responsive to the driver steering intent signal and generating a desired yaw rate signal or a desired side-slip signal;
   a first subtractor responsive to the desired yaw signal and the measured yaw rate signal or the desired side-slip signal and a side-slip estimation signal, said first subtractor generating a dynamical error signal;
   a motion/path prediction processor responsive to the driver steering intent signal and generating a predicted path signal of the predicted path of the vehicle;
   a second subtractor responsive to the predicted path signal and the target path signal, and generating a kinematical error signal;
   a dynamics control processor responsive to the dynamical error signal and generating a dynamics control command signal;
   a kinematics control processor responsive to the kinematical error signal and generating a kinematics control command signal; and
   a control integration processor responsive to the dynamics control command signal and the kinematics control command signal, said control integration processor integrating the dynamics control command signal and the kinematics control command signal into an integrated control command signal, wherein the integrated control command signal can be used to control front-wheel assist steering, rear-wheel assist steering and/or differential braking.

2. The system according to claim 1 wherein the command interpreter processor employs a two-degree of freedom bicycle model using a high coefficient of friction road surface to generate the desired yaw rate signal or the desired side-slip signal.

3. The system according to claim 1 wherein the motion/path prediction processor includes a vehicle dynamics estimation processor and a vehicle kinematics estimation processor, said vehicle dynamics estimation processor generating a vehicle state variable signal based on vehicle lateral velocity and vehicle yaw rate, and said vehicle kinematics estimation processor generating the predicted path signal based on the vehicle state variable signals.

4. The system according to claim 3 wherein the vehicle dynamics estimation processor employs a bicycle model and state feedback to generate the state variable signals.

5. The system according to claim 1 wherein the dynamics control processor employs proportional-integral-derivative control.

6. The system according to claim 1 wherein the kinematics control processor employs an optimal control process that minimizes a predefined cost function.

7. The system according to claim 1 wherein the driver steering intent sensor is a hand-wheel angle sensor.

8. The system according to claim 1 further comprising an actuator responsive to the integrated command signal from the control integration processor.

9. The system according to claim 8 wherein the actuator is selected from the group consisting of a front-wheel steering assist actuator, a rear-wheel steering assist actuator and/or a differential braking control actuator.

10. The system according to claim 1 wherein the target path sub-system is selected from the group consisting of a vision sub-system, a radar sub-system and a map sub-system with a GPS sensor.

11. The system according to claim 1 wherein the control integration processor transforms a slow data rate coordinate frame to a fast data rate coordinate frame.

12. A vehicle lateral control system for a vehicle, said system comprising:
   a hand-wheel angle sensor for providing a driver steering intent signal;
   a yaw rate sensor for providing a measured yaw rate signal of the yaw rate of the vehicle;
   a lateral acceleration sensor for providing a measured lateral acceleration signal of the lateral acceleration of the vehicle;
   a vehicle speed sensor for providing a measured speed signal of the speed of the vehicle;
   a target path sub-system for providing a target path signal indicative of a path of the vehicle;
   a command interpreter processor responsive to the driver steering intent signal and generating a desired yaw rate signal or desired side-slip signal;
   a first subtractor responsive to the desired yaw rate signal and the measured yaw rate signal or the desired side-slip signal and a side-slip estimation signal, and generating a dynamical error signal;
   a motion/path prediction processor responsive to the driver steering intent signal and generating a predicted path signal of the predicted path of the vehicle, said motion/path prediction processor including a vehicle dynamics estimation processor and a vehicle kinematics estimation processor, said vehicle dynamic estimation processor generating a vehicle state variable signal based on vehicle lateral velocity and vehicle yaw rate, and said vehicle kinematics estimation processor generating the predicted path signal based on the vehicle state variable signal;
   a second subtractor responsive to the predicted path signal and the target path signal, and generating a kinematical error signal;
   a dynamics control processor responsive to the dynamical error signal and generating a dynamics control command signal;
   a kinematics control processor responsive to the kinematical error signal and generating a kinematics control command signal;
   a control integration processor responsive to the dynamics control command signal and the kinematics control command signal, said control integration processor integrating in the dynamics control command signal and the kinematics control command signal into an integrated control command signal; and
   an actuator responsive to the integrated command signal from the control integration processor for controlling the vehicle, wherein the integrated control command signal can be used to control front-wheel assist steering, rear-wheel assist steering and/or differential braking.

13. The system according to claim 12 wherein the command interpreter processor employs a two-degree of freedom bicycle model using a high coefficient of friction road surface to generate the desired yaw rate signal or the desired side-slip signal.

14. The system according to claim 12 wherein the kinematics control processor employs an optimal control process that minimizes a predefined cost function.

15. The system according to claim 12 wherein the actuator is selected from the group consisting of a front-wheel steering assist actuator, a rear-wheel steering assist actuator and a differential braking control actuator.

16. The system according to claim 12 wherein the target path sub-system is selected from the group consisting of a vision sub-system, a radar sub-system and a map sub-system with a GPS sensor.

* * * * *